United States Patent [19]

Haug

[11] Patent Number: 4,992,004

[45] Date of Patent: Feb. 12, 1991

[54] INJECTION ADAPTOR FOR AND A METHOD OF APPLYING A CORROSION PROTECTIVE AGENT TO A FIXING ELEMENT ANCHORED IN A HOLE

[75] Inventor: Willi Haug, Freudenstadt, Fed. Rep. of Germany

[73] Assignee: fischerwerke Artur Fischer GmbH & Co KG, Waldachtal/Tumlingen, Fed. Rep. of Germany

[21] Appl. No.: 446,983

[22] Filed: Dec. 6, 1989

[30] Foreign Application Priority Data

Dec. 9, 1988 [DE] Fed. Rep. of Germany ....... 3841577

[51] Int. Cl.[5] .......................................... E21D 20/02
[52] U.S. Cl. ...................................... 405/269; 405/260
[58] Field of Search ............... 405/261, 260, 269, 303, 405/267; 52/698, 704; 264/35, 31

[56] References Cited

U.S. PATENT DOCUMENTS

| | | | |
|---|---|---|---|
| 528,368 | 10/1894 | Harris | 405/269 |
| 2,351,449 | 1/1950 | Noble . | |
| 3,371,494 | 3/1968 | Lagerstrom | 405/260 |
| 3,492,381 | 1/1970 | Rhyne . | |
| 4,362,440 | 12/1982 | Glaesmann et al. | 405/269 |
| 4,765,778 | 8/1988 | Valentine | 405/260 |

FOREIGN PATENT DOCUMENTS

| | | | |
|---|---|---|---|
| 0221682 | 5/1987 | European Pat. Off. . | |
| 0222095 | 5/1987 | European Pat. Off. . | |
| 7721166 | 9/1980 | Fed. Rep. of Germany . | |
| 3100733 | 8/1982 | Fed. Rep. of Germany . | |
| 3538995 | 5/1987 | Fed. Rep. of Germany . | |
| 0628223 | 10/1978 | U.S.S.R. | 405/269 |
| 0796314 | 1/1981 | U.S.S.R. | 405/269 |
| 1131954 | 10/1968 | United Kingdom . | |

Primary Examiner—Dennis L. Taylor
Attorney, Agent, or Firm—Michael J. Striker

[57] ABSTRACT

An injection adaptor for injecting a free-flowing compound into a hole drilled in masonry and into cavities of a fixing element anchored in the drilled hole, and comprising an inner pressure chamber in which a portion of a threaded bolt that forms a part of the fixing element, is received, a nipple for injecting the compound into the inner pressure chamber, and seal elements for sealing the inner pressure chamber with respect to a sleeve that constitutes another part of the fixing element.

2 Claims, 1 Drawing Sheet

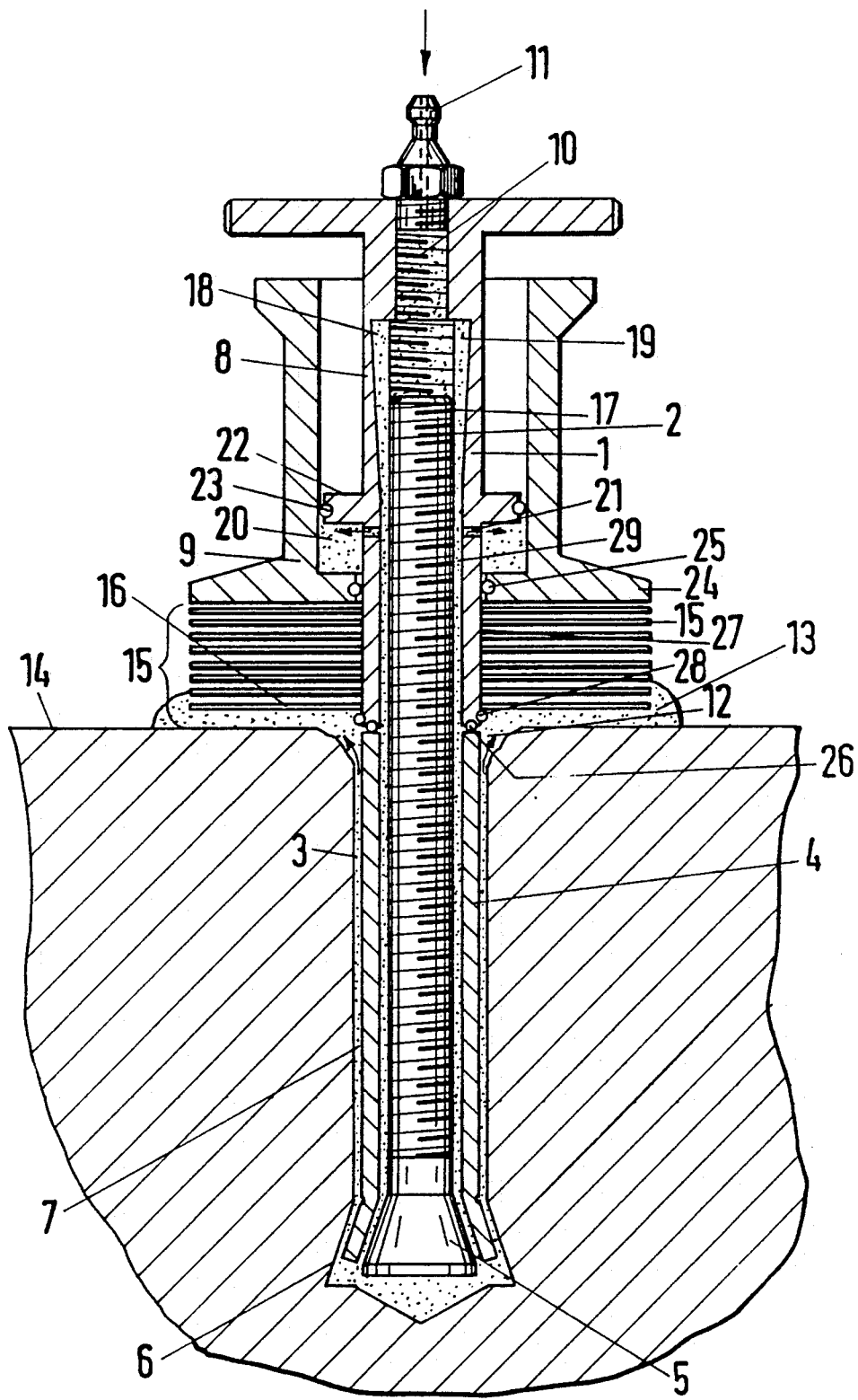

INJECTION ADAPTOR FOR AND A METHOD OF APPLYING A CORROSION PROTECTIVE AGENT TO A FIXING ELEMENT ANCHORED IN A HOLE

BACKGROUND OF THE INVENTION

The invention relates to an injection adaptor for and a method of introducing a free-flowing compound uses as a corrosion-protective agent for a protection of an expansible plug inserted in a hole drilled in masonry.

Fixing elements that are constructed as metal expansible plugs and can be inserted with a matching fit into drilled holes with an undercut are known. Extremely secure fixings can be produced in concrete or similar materials using these fixing elements, and a very high resistance to pull-out forces is attained. In special applications, it may be necessary to provide the metal fixing elements with a corrosion protection, for which purpose a viscous sealing compound can be used.

Corrosion protection for a fixing element of this kind is disclosed in DE-A-35 388 995. There, a sealing compound that is used as a corrosion-protective agent, is first introduced into the drilled hole. The metal expansible plug is then inserted in the drilled hole, the sealing compound being displaced so that it is rises towards the mouth of the drilled hole. The amount of corrosive-protective agent must be so calculated that it is sufficient for corrosion-protective agent to be able to rise up to the mouth of the drilled hole. The cavities inside the fixing element cannot reliably be filled with anti-corrosive agent using this known method.

SUMMARY OF THE INVENTION

The object of the invention is to provide means and method that would enable the corrosive-protective agent to fill the internal cavities of the fixing element. The object of the invention is achieved by using an injection adaptor which guarantees that an anti-corrosive agent is introduced into and around a fixing element inserted in a hole drilled in masonry. The injection adaptor has an inner pressure chamber in which an upper portion of the threaded bolt of the fixing element is received and which is sealed tightly with respect to the front or upper end of a sleeve of the fixing element. An anti-corrosive agent in the form of a free-flowing compound is forced into the injection adaptor under pressure and flows between the threaded bolt and the sleeve into the fixing element until it emerges again at the bottom of the fixing element at the expansible section thereof and rises to the outside of the sleeve which is anchored in the drilled hole, up to the mouth of the drilled hole. This guarantees that, inside and outside, the fixing element is completely covered with the anti-corrosive agent, which provides an optimum protection against corrosion. The anti-corrosive agent can be forced into the pressure chamber of the injection adaptor with a grease gun or similar device through a lubricating nipple.

The injection adaptor is preferably screwed onto the threaded bolt of the fixing element until it lies close to the end face of the sleeve. Once the anti-corrosive agent has been introduced, the injection adaptor is unscrewed again.

It is especially advantageous if the injection adaptor is provided with an outer actuation cylinder which presses small sealing platelets towards the fixing element. At any one time, the lowermost sealing platelet lies against the wall surface of the masonry as the anti-corrosive agent is being injected, so that the anti-corrosive agent rising in the drilled hole, is squeezed out beneath the sealing platelet. The lowermost sealing platelet therefore remains pressed to the wall surface when the injection adaptor is removed, providing a clean closure at the mouth of the drilled hole.

Furthermore, on the internal thread of the injection adaptor or on the thread of the threaded bolt there may be formed longitudinal channels as overflow channels, so that the anti-corrosive agent is able to penetrate without difficulty between the sleeve and the threaded bolt.

The lubricating nipple is preferably designed for a pressure of more than 150 bars, so that the sealing compound or the anti-corrosive agent is able to be forced at high pressure even into narrow cavities of the fixing element.

The injection adaptor is preferably used for metal expansible plugs, the threaded bolts of which have an integral expander cone that engages an expansible part of the sleeve, which is constructed as an expansible plug.

With injection adaptor according to the invention, it is possible to implement a method of applying a corrosion-protective agent to expansible plugs in which a free-flowing compound, which acts as a corrosion-protective agent, passes through the lubricating nipple into the pressure chamber of the injection adaptor and from there inside the sleeve of the fixing element up to the bottom of the drilled hole, and from there outside the sleeve up to the mouth of the drilled hole. In this manner all the cavities are covered with the sealing compound, providing optimum protection against corrosion. As soon as the sealing compound emerges uniformly at the mouth of the drilled hole, injection of the anti-corrosive agent can be stopped.

The present invention both as to its construction so to its mode of operation, together with additional objects and advantages thereof, will be best understood from the following detailed description thereof with reference to the accompanying drawings.

BRIEF DESCRIPTION OF THE DRAWING

The single FIGURE of the drawings shows a cross-sectional view of an injection adapter according to the invention with a metal expansible plug anchored in a hole drilled in masonry.

DETAILED DESCRIPTION OF THE PREFERRED EMBODIMENT

The injection adaptor 1 is screwed onto a threaded bolt 2 of a fixing assembly 3. The fixing assembly 3 is a metal expansible plug assembly which comprises, besides the threaded bolt 2, a sleeve 4. At the lower end of the threaded bolt 2, an expander cone 5 is formed. The cone 5 expands the sleeve 4 so that the sleeve 4 engages with a matching fit in an undercut 6 of the drilled hole 7.

The injection adaptor 1 comprises a cylindrical member 8 having an inner thread for engaging the outer thread of the threaded bolt 2 and an acutation cylinder 9, which is displaceably mounted on the cylindrical member 8. The cylindrical member 8 defines an inner pressure chamber 10 into which a sealing compound can be injected through a lubricating nipple 11 under pressure which may exceed 150 bar. The sealing compound flows under pressure in the direction indicated by arrows, initially between the threaded bolt 2 and the sleeve 4 as far as the undercut 6. Therefrom the sealing compound flows outside of the sleeve 4 as far as the mouth 12 of the drilled hole, until the sealing compound 13 appears on the masonry wall 14.

During the injection operation, the actuation cylinder 9 is pressed towards the wall 14 so that a pile 15 of individual sealing platelets 16, is pressed against the wall 14. The lowermost sealing platelet 16 is, thus, glued securely to the wall surface with the sealing compound. If the injection adaptor 1 is now unscrewed from the threaded bolt 2, the lowermost sealing platelet 11 remains glued to the wall 14.

The cylindrical member 8 has an internal thread 17 which the threaded bolt 2 engages. To enable the sealing compound to flow without hindrance along the threaded bolt 2 through the expansible sleeve, in the region of the internal thread 17, two opposite overflow channels 18, 19 are formed. The overflow channels 18, 19 can be formed as narrow longitudinal grooves.

The actuation cylinder 9 defines a pressure chamber 20 formed outside the cylindrical member 8 connected through holes 21 to the inner pressure chamber 10. To seal the pressure chamber 20, an O-ring 23 is arranged on a flange 22, and an O-ring 25 is arranged on the end wall 24 of the actuation cylinder 9. The front end face of the cylindrical member 8 also has a sealing ring 26 thereon which engages the end face of the sleeve 4. The inner space 29 surrounding the threaded bolt 2, is, therefore, completely sealed as far as the escape openings in the region of the undercut 6. Since the pressure chamber 10 and 20 are connected through bores 21, the injection of the anti-corrosive agent or a sealing compound through the lubricating nipple 11 into the pressure chamber 10 causes a corresponding built-up of pressure in the pressure chamber 20 also. This pressure forces the actuation cylinder 9 downwards, so that the lowermost sealing platelet 16 is pressed against the wall surface 14.

In the illustrated embodiment, the sleeve 4 has no internal thread. It is, however, also possible to use a sleeve 4 with an internal thread, into which a threaded rod provided with longitudinal grooves is inserted from the outside. The longitudinal grooves in the threaded rod then serve as flow channels for the anti-corrosive agent.

The small sealing platelets 16 are thin sheets of paper having an opening 27 through which the cylindrical member 8 extends. A rubber ring 28 which protects the small sealing platelets from accidentally slipping off the cylindrical member 8 may be provided at the lower end of the cylindrical member 8.

While the invention has been illustrated and described as embodied in an injection adaptor for injecting an anti-cossorive agent into a drilled hole in which an expansible plug is anchored, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. An injection adaptor for injecting a free-flowing compound into a hole drilled in masonry and into clearance space between a sleeve and a threaded bolt of fixing means anchored in the drilled hole, said injector adaptor comprising a cylindrical member defining an inner pressure chamber in which a portion of the threaded bolt projecting from the drilled hole is received, said cylindrical member having an inner thread for engaging the threaded bolt and an end face facing the sleeve and located at a mouth of the drilled hole; means for injecting the free-flowing compound into said inner pressure chamber; means for sealing said inner pressure chamber with respect to a sleeve end located at the mouth of the drilled hole, said sealing means comprising a first sealing element located between said end face of said cylindrical member and the sleeve end; overflow channel means formed in an area of said inner thread of enable flow of the free flow compound along the threaded bolt; an actuation cylinder supported on said cylindrical member for axial displacement over said cylindrical member; an outer pressure chamber formed between said acutation cylinder and said cylindrical member; and hole means for connecting said outer pressure chamber with said inner pressure chamber; said cylindrical member having an outer surface on which a pile of sealing platelets is placed, said platelets being pressed toward the sleeve upon pressurization of said outer pressure chamber in response to actuation of said actuation cylinder.

2. An injection adaptor as set forth in claim 1, wherein said cylindrical member has a flange at a lower end thereof and having an axial end surface, said actuation cylinder has an inner wall and an end wall that defines with said flange said outer pressure chamber, and has an opening through which said cylindrical member extends, said sealing means comprising a second sealing element located between said axial end surface of said flange and said inner wall of said actuation cylinder.

* * * * *